Jan. 8, 1952          W. J. HOFFMAN          2,581,659
                    HYDRAULIC DIMPLING UNIT
                      Filed Aug. 25, 1948
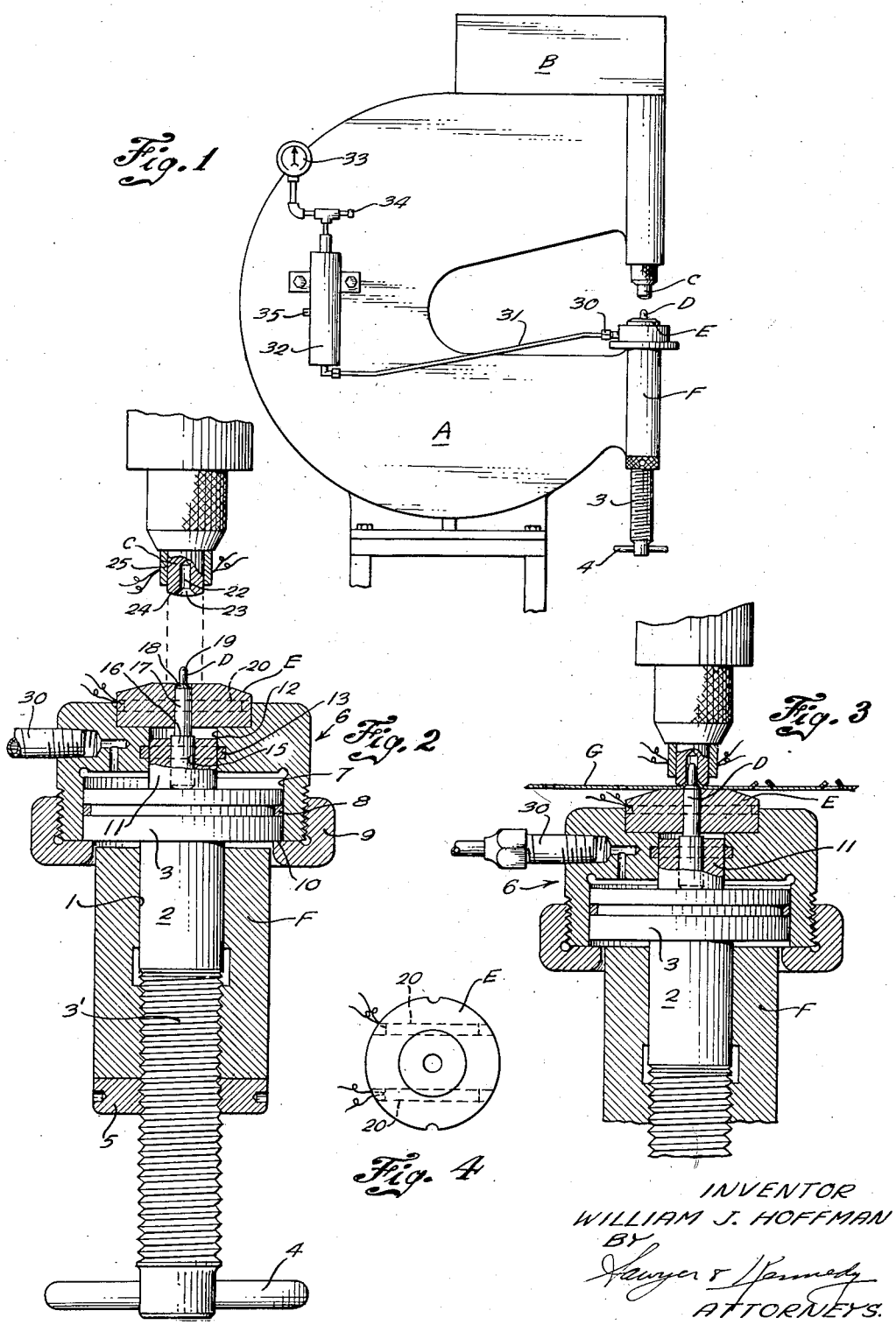
INVENTOR
WILLIAM J. HOFFMAN
BY
ATTORNEYS.

Patented Jan. 8, 1952

2,581,659

UNITED STATES PATENT OFFICE 2,581,659

HYDRAULIC DIMPLING UNIT

William J. Hoffman, Babylon, N. Y.

Application August 25, 1948, Serial No. 46,163

2 Claims. (Cl. 153—21)

This invention relates to improvements in dimpling machines.

It is an object of the invention to provide an improved dimpling machine which permits reduction in "oil canning" of the sheet metal being dimpled, and also permits the formation of a dimple with a sharp corner.

A further object is to provide a dimpling machine which facilitates hot dimpling.

In dimpling, the sheet metal, in which a rivet hole has previously been bored, is subjected to the action of a cooperating punch and die, by means of which the metal around the rivet hole is formed so as to be concave on one side and convex on the other. The punch may be surrounded by a pressure pad and it has been known to support such pads resiliently as by means of rubber or springs. However, the pressure conveniently obtainable has been too low to grip the metal around the rivet hole sufficiently to prevent movement thereof. As a result warping of the metal around the rivet hole, commonly referred to as "oil canning," tends to occur and the rim of the concave side of the dimple tends not to be as sharp or definite in outline as might be desired. The present invention provides a hydraulic cushion for the pad in a dimpling machine, gripping the metal around the punch with sufficient force to prevent oil canning and to form a sharp corner on the dimple.

Where hot dimpling is performed, the invention also provides for reliably maintaining the heat of the metal to the desired degree.

For a full understanding of the invention, a detailed description of a dimpling machine embodying the invention in a preferred form will now be given in connection with the accompanying drawing, and the features forming the invention will then be specifically pointed out in the appended claims.

In the drawing:

Figure 1 is a schematic view of a machine embodying the invention in a preferred form of em embodiment;

Figure 2 is a view in vertical section, and on an enlarged scale, of the parts cooperating to form the dimple;

Figure 3 is a view similar to Figure 2 but showing the parts in a different position; and Figure 4 is a plan view of the pad of Figures 2 and 3.

As shown schematically in Figure 1, the dimpling machine comprises a squeezer or compression riveter of generally known type, in which the yoke or frame A carries operating mechanism B for reciprocating a die C vertically against a cooperating punch D and pad E which are supported on the lower head F of the yoke.

The cooperating elements are shown in detail on an enlarged scale in Figures 2 and 3. As shown in Figure 2, the head F is formed with a central bore 1 forming a socket for receiving the shank 2 of a piston 3. The height of the piston 3 may be regulated or adjusted by means of a screw 3' carried in the threaded lower part of the bore 1, the screw 3 being turned by means of handle 4 and held in the desired position of adjustment by a lock nut 5.

A cylinder designated generally by the numeral 6 has an inner bore 7 cooperating with the piston 3 and sealed thereto by means of an O-ring 8 carried in a groove in the piston. Upward movement of the cylinder 6 is limited by means of an annular cap 9, screwed thereon and having a shoulder or lip 10 for engaging under the piston as indicated.

The cylinder 6 is formed with a socket for holding the pad E and the punch D is supported by the piston 3. For this purpose piston 3 has a cylindrical upper projection 11 fitting within a bore 12 of the cylinder 6 and sealed thereto by an O-ring 13 carried in a groove in the latter. The projection 11, in turn, has a central socket 15 which holds the punch D, the enlarged shank 16 thereof fitting within the socket as indicated. The punch D further comprises a reduced section 17 fitting within a corresponding central bore of the pad E, a conical shoulder 18 for forming the dimple and a tip 19 which passes through the previously bored rivet hole in the sheet being dimpled.

For hot dimpling, the pad E may be heated as by means of heater elements 20 within it. Where hot dimpling is not being done, these heater elements may be omitted.

The die C is formed with a central aperture comprising a bore 22, which receives the tip 19 of the punch, and a conically flared mouth 23, which cooperates with the conical shoulder 18 of the punch to form the dimple. The annular surface 24 of the die surrounding the opening cooperates with the pad E to hold the metal being formed as later described. The surface 24 is substantially flat but is slightly tapered. The extent of taper is exaggerated in the drawing and will normally be of the order of one degree, ranging from half a degree to two degrees depending upon the material being worked. An electric heater 25 may be provided for heating the die, and may be omitted when hot dimpling is not being done.

The cylinder connects by means of a fitting 30 to a hydraulic hose 31 (Fig. 1), which connects to the bottom of an accumulator 32 fastened to the yoke A, as indicated in Figure 1. Surmounting the accumulator 32 is a pressure gauge 33 and a fitting 34 including an air valve for introducing air under pressure into the upper part of the accumulator. The accumulator also has a plug 35 positioned midway between its top and bottom for introducing or removing oil. The cylinder 6 and oil line 31 will be filled with oil at all times and the accumulator 32 will be filled half way up, or up to the level of the plug 35. Pressure is supplied by introducing air from a pressure bottle or other convenient source through the fitting 34, so as to maintain a pressure of about 600 p. s. i. As will be apparent, the hydraulic pressure within the cylinder, acting against the piston 3 (which is stationary), forces the cylinder up into the position of Figure 2 with the lip 10 engaging under the piston. When the die comes down, as indicated in Figure 3, the pad E and cylinder 6 are forced down against the hydraulic pressure. Further movement forms the dimple.

The sheet metal G, as indicated in Figure 3, will normally have a line or other pattern of rivet holes of diameter corresponding to the tip 19 of the punch, preformed in it. For forming the dimple, one of these holes is placed over the tip 19 of the punch, the parts being in the position of Figure 2. The die C now comes down and the annular surface 24 will engage the metal G first, forcing it against the pad E and thus forcing the pad E downwardly against the hydraulic pressure within the cylinder. The conical portion 18 of the punch being below the surface of the pad at this time, the first action which occurs will accordingly be the gripping of the sheet between the die and the pad. Further movement of the die forces the pad still further down, exposing the conical portion 18 of the punch, and forming the metal into a dimple between this conical portion 18 and the flare 23 of the die.

By reason of the fact that the sheet metal G is firmly gripped between the die C and the pad E at the time when the punch D is forming the dimple, the movement of the metal around the dimple is prevented, thus preventing "oil canning" and forming an exceptionally sharp corner around the dimple.

In a typical installation the total pressure applied to the cylinder by the hydraulic fluid may be approximately two tons. As the sheet being dimpled is forced down by the die so as to unseat the cylinder, this pressure is carried by the annular surface 24, which may be about .15 square inch in area or thereabouts, resulting in a gripping pressure on the metal, neglecting the taper of the surface 24, of the order of 25,000 pounds per square inch. The actual effective gripping pressure which is exerted may be higher than this due to the slight taper of the surface 24. It will be apparent that the invention provides for applying gripping pressures between die and pad of any usable magnitude which may be desired, and that the limiting factor on the gripping pressure values which are used may be merely the ability of the metal around the dimple to resist undesirable permanent change of form.

While the total travel of the cylinder 6 against the hydraulic pressure may be of the order of one-sixteenth of an inch or thereabouts, the pad pressure may be sufficient so that as much as one-half the power consumed by the machine is utilized in overcoming the pad resistance. It is found that the hydraulic system as constructed is capable of dissipating this power without undue heating.

As will be apparent to those skilled in the art, provision for dimples of different sizes may be made by substituting sets of dies, punches and pads, C, D and E, having different dimensions of coacting parts but fitting within the sockets provided therefor as indicated in the drawing.

Where hot dimpling is done, the strong holding pressure between the die C and the pad D provides excellent contact between these elements and the sheet surrounding the dimple so that the best possible heat transfer conditions are obtained. Thus it is possible to heat the sheet adjacent the rivet hole to the desired temperature in the shortest possible time and maintain it at such temperature while the dimple is being formed. The very firm gripping of the sheet also eliminates difficulties that might otherwise arise due to thermal expansion of the metal when heated. In hot dimpling the cycle of operations is the same as in the cold dimpling previously described, but the down stroke of the die C is interrupted for a sufficient length of time just before the punch D comes into operation to permit bringing the metal to the desired temperature for forming the dimple.

What is claimed is:

1. In a dimpling machine, the combination with a movable die and cooperating punch of a stationary piston carrying a projection having a socket for supporting the punch, a movable cylinder cooperating with the piston and projection, the cylinder having a socket for supporting a pad surrounding the punch, and means for maintaining hydraulic pressure within the cylinder.

2. In a dimpling machine, the combination with a movable die and cooperating punch of a stationary piston carrying a projection having a socket for supporting the punch, a movable cylinder cooperating with the piston and projection, the cylinder having a socket for supporting a pad surrounding the punch, an accumulator and a pressure line connecting it to the cylinder for maintaining hydraulic pressure within the cylinder.

WILLIAM J. HOFFMAN.

REFERENCES CITED

The following references are of record in the file of this patent:

UNITED STATES PATENTS

| Number | Name | Date |
|---|---|---|
| Re. 22,163 | Ernst | Aug. 25, 1942 |
| 298,224 | Morgan | May 6, 1884 |
| 1,401,371 | Strand | Dec. 27, 1921 |
| 2,379,003 | Hedberg | June 26, 1945 |
| 2,453,762 | Schwartz | Nov. 16, 1948 |